US007130444B2

(12) United States Patent
Honsinger et al.

(10) Patent No.: US 7,130,444 B2
(45) Date of Patent: Oct. 31, 2006

(54) METHOD OF AUTHENICATION FOR STEGANOGRAPHIC SIGNALS UNDERGOING DEGRADATIONS (75) Inventors: Chris W. Honsinger, Ontario, NY (US); Gustavo R. Paz-Pujalt, Rochester, NY (US); Donald R. Williams, Williamson, NY (US); Jerry Carmen, Spencerport, NY (US)

(73) Assignee: Eastman Kodak Company, Rochester, NY (US)

( * ) Notice: Subject to any disclaimer, the term of this patent is extended or adjusted under 35 U.S.C. 154(b) by 605 days.

(21) Appl. No.: 10/292,665

(22) Filed: Nov. 12, 2002

(65) Prior Publication Data
US 2004/0091131 A1 May 13, 2004

(51) Int. Cl.
G06K 9/00 (2006.01)
(52) U.S. Cl. ..................................... 382/100
(58) Field of Classification Search ............... None
See application file for complete search history.

(56) References Cited

U.S. PATENT DOCUMENTS

| 5,832,119 | A | 11/1998 | Rhoads ...................... 382/232 |
|---|---|---|---|
| 5,835,639 | A | 11/1998 | Honsinger et al. .......... 382/278 |
| 5,905,819 | A | 5/1999 | Daly .......................... 382/284 |
| 6,044,156 | A | 3/2000 | Honsinger et al. ............ 380/54 |
| 6,823,075 | B1 * | 11/2004 | Perry ......................... 382/100 |
| 2002/0029338 | A1 * | 3/2002 | Bloom et al. ................ 713/176 |
| 2002/0176114 | A1 * | 11/2002 | Zeller et al. ................ 358/3.28 |
| 2003/0056104 | A1 * | 3/2003 | Carr et al. .................. 713/176 |
| 2003/0156733 | A1 * | 8/2003 | Zeller et al. ................ 382/100 |
| 2004/0190751 | A1 * | 9/2004 | Rhoads et al. .............. 382/100 |

OTHER PUBLICATIONS

"*Benchmarking of the ISO 12233 Slanted-edge Spatial Frequency Response Plug-in*", by Don Williams, Imaging Research and Advanced Development, Eastman Kodak Company, Rochester, New York, 1465-1925, IS&T's 1998 PICS Conference, pp. 133-136.

* cited by examiner

Primary Examiner—Samir Ahmed
Assistant Examiner—O'Neal R. Mistry
(74) Attorney, Agent, or Firm—Peyton C Watkins

(57) ABSTRACT

A method for authenticating a printed or scanned embedded image is disclosed that utilizes a prediction of the effect of a print or scanning process on the embedded message based upon characteristics of the printer or scanner. These values are measured directly at the time of authentication and compared to the predicted. Based on the comparison a decision is made regarding authenticity.

3 Claims, 6 Drawing Sheets

A binary message of +1's and -1's

An iconic message as an edge map

METHOD OF AUTHENICATION FOR STEGANOGRAPHIC SIGNALS UNDERGOING DEGRADATIONS

FIELD OF THE INVENTION

The invention relates generally to the field of image processing, and in particular to authenticating steganographically encoded commercial items such as a lottery ticket, a coupon, a soup can, a cereal box, a whiskey label or other instrument carrying information. The invention utilizes aspects of data embedding. The science or art of data embedding is also referred to as data hiding, information hiding, data embedding, watermarking and steganography.

BACKGROUND OF THE INVENTION

Marketing of products and services through the use of coupons, brochures, labels, cereal boxes and lottery tickets is undoubtedly very effective in increasing awareness of consumers of companies and products. One useful way to market a product is to provide a valuable prize if a person has a winning number. The vendor may only be able to give several of the prizes without losing money. In this circumstance, preventing counterfeiting becomes important.

Steganography allows information to be placed in a hidden way in these instruments. A steganographic signal can be embedded in a picture, removing the need for bar codes or other explicitly printed accounting information. The value of this is that the packaging becomes more esthetically pleasing and the consumer is likely to be more interested in using the instrument.

Today's steganographic technologies are very robust to surviving the print scan cycle or other adverse process such as markings, tears, compression, smoothing, noise, etc. This poses a problem in the case of a lottery or coupon with a prize because the ticket can be scanned and reprinted, and the steganographic signal will be maintained, allowing the user to win with a counterfeit instrument and win a second time with the original instrument. Similarly, in many countries, forgery of brand name consumables such as whiskeys, cigarettes and cereals is rampant. With today's steganographic techniques, without other measures, simply copying an authentic label using a scanner and a printer is sufficient enough to guarantee the authentication of the embedded signal of the copied label.

A powerful technique that can be used for these kinds of steganographic instruments is disclosed in copending U.S. patent application Ser. No. 09/613,989. A method is disclosed that enables the use of paper or textured media to be authenticated based upon an embedded signal derived from the textural attributes of the media. A carrier is formed by scanning a region or multiple regions of the media and is convolved with a message to form an authenticable signal. After scanning, the carrier is subdivided and rearranged in ways that prevents a person from "discovering" the carrier. The drawback with this method is that it requires a scan of the media before a picture containing the steganographic signal is printed. This presents a loss of efficiency for companies already producing authenticable instruments because their existing workflow needs to be changed.

The present invention provides a solution to these problems.

SUMMARY OF THE INVENTION

A method for authenticating a printed or scanned embedded instrument is disclosed that utilizes a prediction of the effect of a print or scanning process on the embedded message based upon characteristics of the printer or scanner. The predictions are stored in combination with other data in the embedded message payload. These metrics or values are also measured directly at the time of authentication and compared to the predicted. Based on the comparison a decision is made regarding authenticity. Examples of preferred prediction values are derived from the device MTF and noise characteristics. Means for predicting and measuring the local impact of the instrument itself on the printed and scanned embedded image is also provided.

DETAILED DESCRIPTION OF THE INVENTION

Figure 1:
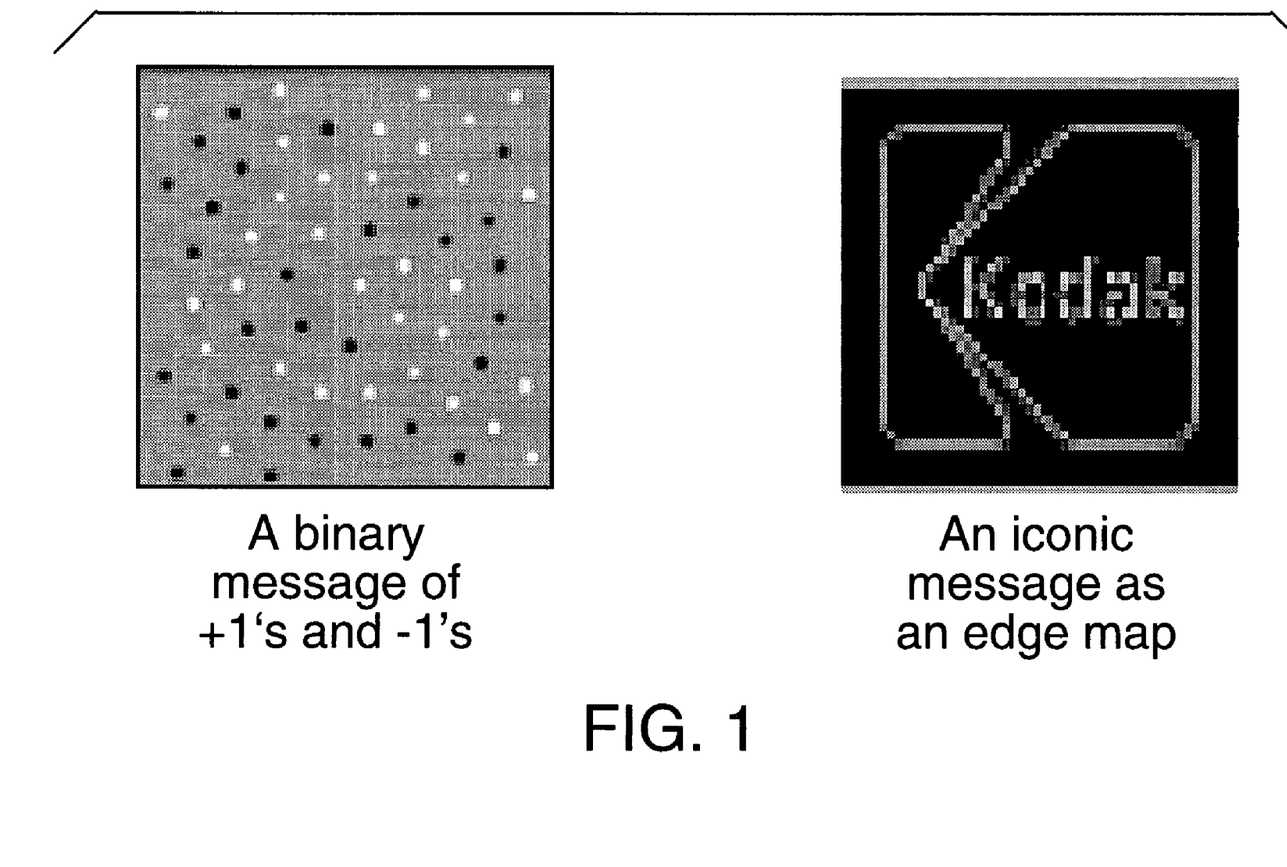
FIG. 1 is a drawing of exemplary embedded messages.

A preferred data embedding technique is disclosed in Honsinger, et al., U.S. Pat. No. 6,044,156, "Method for generating an improved carrier for use in an image data embedding application". Here, an original image is represented as the two-dimensional array, I(x,y), the embedded image, I'(x,y), and a carrier is defined as C(x,y). A message that is embedded, M(x,y), in its most general form is an image. The message can represent an icon, for example, a trademark, or may represent the bits in a binary message. In the latter case the on and off states of the bits are represented as plus and minus ones, or positive and negative delta functions (spikes) which are placed in predefined and unique locations across the message image. An example of a binary and iconic message image is shown in FIG. 1. Examples of iconic data types are trademarks, corporate logos or other arbitrary images. Performance generally decreases as the message energy increases so edge maps of the icons are used. Examples of binary data types are 32 bit representations of URL's, and copyright ID codes, or authentication information.

With these definitions the preferred embedding equation is:

$$I'(x,y)=\alpha(M(x,y)*C(x,y))+I(x,y), \quad (1)$$

where the symbol, *, represents circular convolution and α is an arbitrary constant chosen to make the embedded energy simultaneously invisible and robust to common processing. From Fourier theory, spatial convolution in the frequency domain is the same as adding phase while multiplying magnitudes. Therefore, the effect of convolving the message with a carrier is to distribute the message energy in accordance with the phase of the carrier and to modulate the amplitude spectrum of the message with the amplitude spectrum of the carrier. If the message were a single delta function and the carrier of random phase and of uniform Fourier magnitude, the effect of convolving with the carrier would be to distribute the delta function over space. Similarly, the effect of convolving a message with a random phase carrier is to spatially disperse the message energy.

The preferred extraction process is to correlate with the same carrier used to embed the image:

$$I'(x,y) \otimes C(x,y) = \alpha(M(x,y) * C(x,y)) \otimes C(x,y) + I(x,y)$$
$$\otimes C(x,y), \quad (2)$$

where the symbol, $\otimes$, represents circular correlation. Correlation is similar to convolution in that Fourier magnitudes also multiply. In correlation, however, phase subtracts. Therefore, the phase of the carrier subtracts on correlation of the embedded image with the carrier leaving the message. Indeed, if it is assumed that the carrier is designed to have uniform Fourier amplitude, then the process of correlation of the carrier on the embedded image Eq. 2, can be reduced to:

$$I'(x,y) \otimes C(x,y) = \alpha M(x,y) + \text{noise} \quad (3)$$

That is, the process of correlation of the embedded image with the carrier reproduces the message image plus noise due to the cross correlation of the image with the carrier.

Tiling the dispersed message on the original image improves the robustness of the algorithm. For the present invention, a single 128×128 dispersed message is tiled over the entire image. Upon extraction, each 128×128 region is aligned and summed to produce the final message. As disclosed in copending U.S. patent application Ser. No. 09/453,247, for imaging applications with severe quality loss, such as small images printed using ink-jet printers on paper, a weighting factor that depends on the estimated signal to noise ratio can be calculated and applied to each extracted message element before summation.

If the extracted message is denoted as M'(x,y), the equations for extracting the message (Eq. 2 and Eq. 3) can be written as:

$$M'(x,y) = \alpha M(x,y) * (C(x,y) \otimes C(x,y)) + \text{noise} \quad (4)$$

The above equation suggests that the resolution of the extracted message is fundamentally limited by the autocorrelation function of the carrier, $C(x,y) \otimes C(x,y)$. Any broadening of $C(x,y) \otimes C(x,y)$ from a delta function will blur the extracted message when compared to the original message. Another way to view the effect of the carrier on the extracted message is to consider $C(x,y) \otimes C(x,y)$ as a point spread function, since convolution of the original message with $C(x,y) \otimes C(x,y)$ largely determines the extracted message.

The design of the carrier should consider both the visual detectability of the embedded signal and the expected signal quality at the extraction step. There is clearly a design tradeoff between achieving optimum extracted signal quality and embedded signal invisibility.

A carrier designed for optimal extracted signal quality will possess increasing amplitude with increasing spatial frequency. This may be derived from the well-known characteristic of typical images that the Fourier amplitude spectrum falls as the inverse of spatial frequency. At low spatial frequencies, where typical images have their highest energy and influence on the extracted image, our carrier uses this result. In particular, the mean or DC frequency amplitude of our carrier is always zero. As spatial frequency is increased, the carrier amplitude envelope smoothly increases with increasing spatial frequency until about 1/16 to 1/5 Nyquist.

For frequencies greater than this, the carrier envelope can optionally be derived from a Contrast Sensitivity Function (CSF). Use of the CSF in an image embedding application is described in detail in Daly, U.S. Pat. No. 5,905,819, May 18, 1999, "Method and Apparatus for Hiding One Image or Pattern Within Another".

Figure 2:
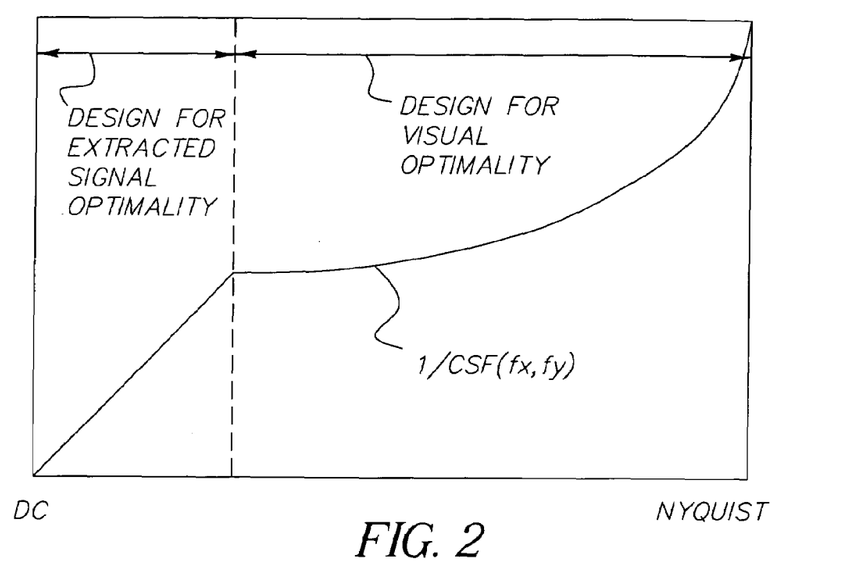
FIG. 2 is a drawing of a reciprocal of the CSF.

The CSF provides a measure of the sensitivity of the average observer to changes in contrast at a given spatial frequency. The reciprocal (FIG. 2) of the CSF can be used to prescribe the amount of amplitude needed for the embedded signal to be detectable by an average viewer. Many modern CSF models facilitate for observer viewing distance, background noise, receiver dot density, color component wavelength and other factors.

Use of these CSF parameters can be an advantage when optimizing an embedding algorithm for a specific application. One particularly useful way of sizing the embedding algorithm for a specific system is to define the quality of the embedded signal in terms of the viewing distance at which the embedded signal can be visually detected. Once this is defined, an optimized carrier can be immediately derived and tested.

For a binary message, the impact of this carrier envelope is to produce a very small sidelobe around each delta function. It may be argued that the sidelobes rob the algorithm of bandwidth. However, it has been found that the destructive processes of compression, error diffusion, printing and scanning have a far greater influence on the bandwidth of the algorithm. In a binary message, these destructive processes are the limiting factor of the bit density and can be thought of as defining the minimum separation distance between the delta functions. So long as the sidelobes are confined within half of the minimum bit separation distance, sidelobe interference may be considered minimal.

Correcting for rotation, scaling and skew is a fundamental element of all robust data embedding techniques. In Honsinger, et al., U.S. Pat. No. 5,835,639, "Method for Detecting Rotation and Magnification in Images", a preferred method of correction of rotation and scale is provided. The correction technique relies on autocorrelation the embedded image. For example, upon autocorrelation of an embedded image that has not been rotated or scaled, it is expected that correlation peaks are spaced horizontally and vertically at intervals of 128 pixels and 128 lines. At the zero offset correlation point, there is a very high peak due to the image correlating with itself.

Now, if the embedded image is scaled, the peaks must scale proportionately. Similarly, if the embedded image is rotated, the peaks must rotate by the same amount. Therefore, the rotation and scale of an image can be deduced by locating the autocorrelation peaks. Detection of the actual rotation angle θ is limited to angles in the range (−45°,+45°]. However, the actual rotation angle will be a member of the set $\theta_{actual} = \theta_{calculated} \pm n90°$, where n is an integer. Because the image is tested for the possibility that the image has been flipped or rotated in increments of 90 degrees during the message extraction process, this ambiguity is not a fundamental limitation.

The effect of the autocorrelation properties of the original image can be significant. Without ancillary processing, high amplitude low frequency interference in the autocorrelation image can make the process of detecting peaks difficult. To minimize this problem, practice of the invention disclosed in copending U.S. patent application Ser. No. 09/452,415 is performed. Here, localized first order and second order moment normalization on the embedded image is applied before the autocorrelation. This process consists of replacing each pixel in the image with a new pixel value, $v_{new}$:

$$v_{new} = \frac{\sigma_{desired}}{\sigma_{old}}(v_{old} - m_{old}) \qquad (5)$$

where $v_{old}$, is the original pixel value, $m_{old}$, is the local mean of the image, $\sigma_{desired}$ is the desired standard deviation, which is generally set to the expected embedded signal standard deviation and $\sigma_{old}$ is the local standard deviation. Because this operation is over a small area, typically over a (3×3) or (5×5) region, its effect in removing the high amplitude, low frequency coherent noise is quite substantial. For the limiting case when $\sigma_{old} \rightarrow 0$, we simply equate $v_{new}$ to a value taken from a random noise generator having a standard deviation $\sigma_{desired}$.

The next piece of ancillary processing performed is to shape the autocorrelation peaks also described in Honsinger, et al., U.S. Pat. No. 5,835,639. This is done during the FFT operation used in the autocorrelation processing. A function that increases linearly with spatial frequency in the Fourier magnitude domain is quite satisfactory. This function is consistent with a Wiener filter designed to maximize the semblance of the correlation peaks to delta functions under the assumption that the image Fourier amplitude spectrum exhibits an asymptotic "1/(spatial frequency)" falloff. Following these processing steps produces peaks that need little further processing.

Importantly, because autocorrelating the embedded image requires no extra calibration signal, it does not tax the information capacity of the embedding system. In the art and science of steganography, reserving as much information for the data to be conveyed is of paramount importance. Because of this, using the autocorrelation technique provides a significant improvement over the teachings of Rhoads, U.S. Pat. No. 5,832,119, "Methods for Controlling Systems Using Control Signals Embedded in Empirical Data", because for this system a "subliminal graticule" or extra signal must be used correctly for rotation or scale.

The ability to recover from cropping is an essential component of a data embedding algorithm. As disclosed in copending application U.S. patent application Ser. No. 09/453,160, if extraction occurred from an arbitrarily located 128×128 region of an embedded image, the extracted message would probably appear to be circularly shifted due to the unlikely chance that the extraction occurred along the original message boundary.

Indeed, if the origin of the 128×128 extracted region was a distance, $(\Delta x, \Delta y)$, from its nearest "original" origin, then the extracted message, $M'(x,y)$ can be written as:

$$M'(x,y)=M(x,y)*\delta(x-\Delta x, y-\Delta y) \qquad (6)$$

where it is assumed that the convolution is circular, that the carrier autocorrelated to a delta function and that the image contributes no noise.

On the surface, this circular shift ambiguity is a severe limitation on data capacity because it imposes the constraint that the message structure must be invariant to cyclic shifts. However, a way around this is found in copending U.S. patent application Ser. No. 09/452,415 which places the bits in the message in a special manner. First, required in a message template, that is, a prescription of where to place the bits in a message image. The message template is derived by placing positive delta functions on a blank 128×128 image such that each delta function is located a minimum distance away from all others and such that the autocorrelation of the message template yields as close as possible, a delta function. That is, the bits are placed such the message template autocorrelation sidelobes are of minimal amplitude.

Now, correlation of the extracted region with a zero mean carrier guarantees that the extracted circularly shifted message $M'(x,y)$ is also zero mean. If the message template is called $T(x,y)$, then the absolute value of the the extracted template must be practically equivalent to a circularly shifted message template. That is, $$|M'(x,y)|=T(x,y)*\delta(x-\Delta x, y-\Delta y) \qquad (7)$$

This implies, due to the autocorrelation property of the message template, that the shift from the origin of the message can be derived by correlating $|M'(x,y)|$ with $T(x,y)$, since:

$$|M'(x,y)| \otimes T(x,y) = \delta(x-\Delta x, y-\Delta y) \qquad (8)$$

Therefore, the result of the correlation will be a 128×128 image, whose highest peak will be located at the desired shift distance, $(\Delta x, \Delta y)$. This peak location can be used to correctly orient the interpretation of the embedded bits.

Following the above prescription for data embedding results in a highly robust system for transmission of data on printed materials. The algorithms have been shown to work under very stressful conditions such as printing/scanning, cropping, wrinkling, and marking, skewing and mild warping. In one sense, a user desires to use such a robust system because consumers will put the tickets in their pocket, spill drinks on it, wrinkle it, etc. However, in another sense, the user doesn't want such a robust system because its robustness makes it possible to counterfeit the ticket. For example, the user could have his ticket printed at a kiosk, scan it, and print it out at home. Since the embedded signal should survive the process of a printing and scanning, the user could give the counterfeited ticket to a friend to take the counterfeited ticket to an authentication kiosk and the friend could collect a prize and go home. The next day the user could go back to the kiosk with the original and the ticket would be flagged as invalid despite its actual authenticity.

Figure 3:
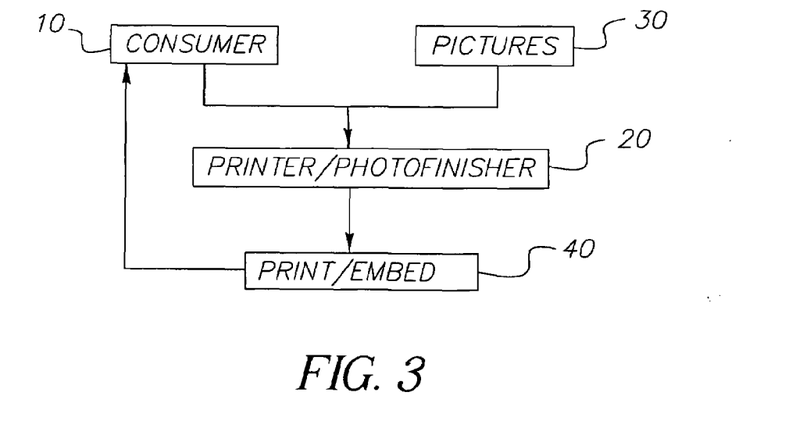
FIG. 3 is flowchart of the basic process involved in photofinishing.
Figure 4:
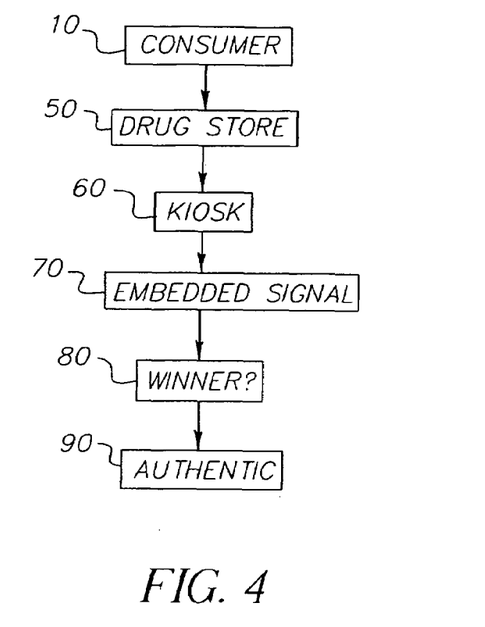
FIG. 4 is a diagram for determining authenticity using a kiosk.

Referring to FIG. 3, a diagram is shown designating the basis processes involved in photofinishing. To determine if the ticket has gone through a second print scan cycle, it shall be assumed that a contest is being offered from a large photofinisher or printer 20. If a consumer 10 uses the photofinisher or printer 20 to develop and print 40 his photos, a steganographic signal will be hidden imperceptibly in the picture 30. The picture is developed or printed 40 and returned to the consumer 10. Now refer to FIG. 4, the consumer 10 takes the prints to a drug store 50 having a kiosk 60. The kiosk 60 reads the embedded signal 70 determines if the ID is a winner 80 and determines if the image is authentic 90. If the image is not a winner step 90 is not necessary. Clearly, if the image is authentic and if the image is a winner, then the kiosk displays the winner status on its display.

Figure 5:
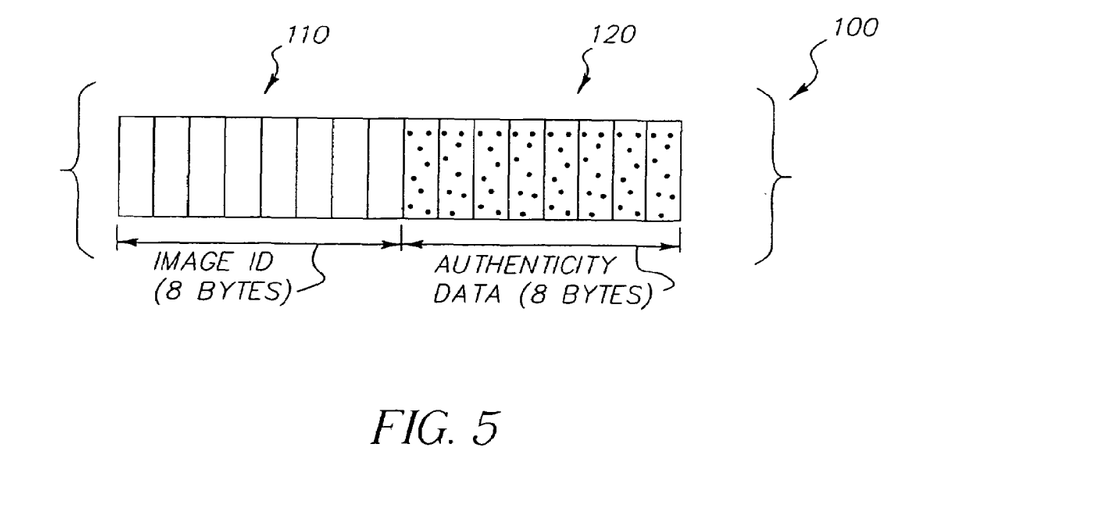
FIG. 5 is a diagram illustrating a typical payload for an authenticable signal or image.

Referring to FIG. 5, the data embedded in the embedding process of FIG. 3 step 30, or the payload 100, for purposes of specificity is 128 bits is shown. The first 8 bytes (or 64 bits) is reserved for image ID 110 and winner status. 64 bits allows for approximately four billion squared images, and it is understood that only a few of these numbers will actually be a winner. The content of the authenticity 120 part of the payload 100 will be described in detail later.

It is well known to those skilled in the art of image processing that printers and scanners can be well characterized with knowledge of the device MTF, (Modulation Transfer Function) and random noise characteristics. Tone transfer information and color fidelity is generally also important, but in the case of steganography, they are less important because the effects of these kinds of device miscalibrations are low frequency in nature. If the teachings of Honsinger et al., U.S. Pat. No. 6,044,156, "Method for Generating an Improved Carrier for Use in an Image Data Embedding Application", are followed, the lower frequencies used to carry the steganographic signal are minimized in amplitude, rendering the impact of tonal or color shifts unimportant to the steganographic problem. That is, tonal or color data changes has very little impact on the extraction process. Tonal or color data can be stored as authentication data but the ability to counterfeit is still high because a counterfeiter need only to emulate the color or tone data in the counterfeited instrument. For brevity, allow the symbolism (x,y) used in the above equations, designating two dimensionality, to be dropped. Recalling the embedding equation above:

$$I' = I + M*C \tag{9}$$

Since the MTF and additive noise characteristics of the printer and scanner can be known in advance, the effect of the printer on the embedded image at the printer may be summarized using the following equation:

$$I'' = MTF_{printer} * I' + \text{Noise}_{printer} = MTF_{printer} * M * C + MTF_{printer} * I + \text{Noise}_{printer} \tag{10}$$

Where it is understood that I" represents the image after printing. Similarly, the effect of the scanner can be summarized as:

$$\begin{aligned} I''' = &MTF_{scanner} * MTF_{printer} * I' + \\ &MTF_{scanner} * \text{Noise}_{printer} = MTF_{scanner} * MTF_{printer} * M * C + \\ &MTF_{scanner} * MTF_{printer} * I + \\ &MTF_{scanner} * \text{Noise}_{printer} + \text{Noise}_{scanner} \end{aligned} \tag{11}$$

Where it is understood that I''' represents the image after printing and scanning. Now the extracted message M''' after scanning can be found by correlating Equation 11 with the carrier:

$$M''' = \underbrace{MTF_{scanner} * MTF_{printer} * M}_{\text{Term 1}} + \underbrace{MTF_{scanner} * MTF_{printer} * I \otimes C}_{\text{Term 2}} + \underbrace{MTF_{scanner} * \text{Noise}_{printer} \otimes C}_{\text{Term 3}} + \underbrace{\text{Noise}_{scanner} \otimes C}_{\text{Term 4}} \tag{12}$$

For reasons discussed earlier, it is understood that with the reasonable approximation: $C \otimes C = \delta$, Term 1 of Equation 12 loses its dependence on the carrier and has been eliminated from the equation.

Equation 12 demonstrates an important point. Terms 2, 3 and 4 of Equation 12 do not depend on the message. Knowledge of the printer and scanner's MTF, random additive noise characteristics, and original image content (Term 2) is sufficient to determine the quality of the extracted steganographic signal. This means that an estimate of the impact of a future print scan cycle can be formed and it can be embedded in the message payload (see FIG. 5 part 120) without consideration of its own impact on the print scan cycle. Term 2 depends on the carrier and the image data and has generally, from experience, the most significant contribution to the degradation of the extracted message. The impact of the image data can be calculated and stored in the message (Term 1) with out further consideration of its own impact on the degradation process. Since the message data is tiled over 128×128 regions in the preferred embodiment, the authenticity data can be calculated and stored locally in each 128×128 region of the image.

The nature of the authenticity data stored has thus far not been specified. There are many ways to store this data. One way is to choose a few MTF and noise values at a predetermined set of spatial frequencies and store the actual values or a compressed representation of the values. A preferred way is to simply apply Equation 12 as a function of the local image content and to measure the resulting signal and noise values. Next place the measured authenticity data in the message payload. This will be described in detail hereinbelow. At the time of authentication, the signal and noise values are measured, after the printing and scanning, of course, and these values are compared to the stored values in the authentication part of the payload. If the values are within 10% of the stored values the embedded image is declared authentic, if not, then the embedded image is flagged as suspicious or counterfeit. Practice has shown that storing a signal to noise ratio is not sufficient because signal to noise ratios give less information than signal and noise values stored independently.

Using the latter concept as a basis for the preferred embodiment, the detailed description will now be provided for the embedding part. Acquiring the MTF and noise characteristics of a given printer and scanner can be accomplished using the many techniques known in the art, specifically as disclosed in "Benchmarking of the ISO 12233 Slanted-edge Spatial Frequency Response Plug-in", by Don Williams, Imaging Research and Advanced Development, Eastman Kodak Company, Rochester, N.Y., 1465–1925, IS&T's 1998 PICS Conference, pages 133–136. It is preferred that a two dimensional MTF and noise field is provided for the most accurate simulation. This is because as systems, the printer and scanner often operate in a raster fashion, producing differences in horizontal and vertical MTF's and noise fields. For simplicity, and without loss of generality, assume further, that the MTF and noise fields are described by spatial images and that it is recognized as obvious that convolution and correlation can be either performed in the space domain or in the Fourier domain using the rules set forth earlier. Two dimensional MTF's can be constructed from two one dimensional MTF's by using the following equation:

$$MTF(u,v) = MTF(u)MTF(v) \tag{13}$$

Equation 13 simply states that the MTF is product separable, an assumption that is not always valid, but is good enough for the practice of this invention. To produce an MTF image that can be used in Equation 12 above, simply take the inverse Fourier transform of Equation 13. Generally the MTF curves may be obtained by the manufacturer or by measurement. Equation 12 states that there are two sources of noise, the printer and the scanner. Modem day scanners introduce negligible noise and term 4 of Equation 12 can be ignored if the scanner is a relatively good one. Term 4 is included for cases where it may be of importance such as very inexpensive scanners. The primary source of noise is in the printing process. This is particularly true for ink jet printers. A noise image can be formed by printing a uniform field on the printer and removing the average value after scanning. Also, a noise image can be synthesized by using a random number generator producing a random field of the same standard deviation of the noise measured or provided for by the printer or scanner manufacturer.

Figure 6:
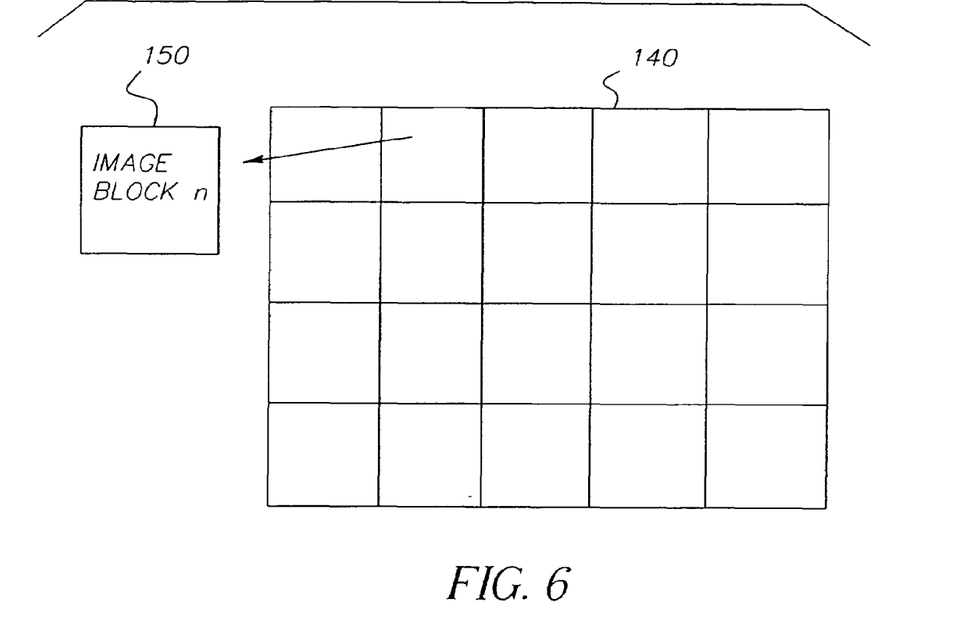
FIG. 6 is an image divided into sub-blocks.
Figure 7:
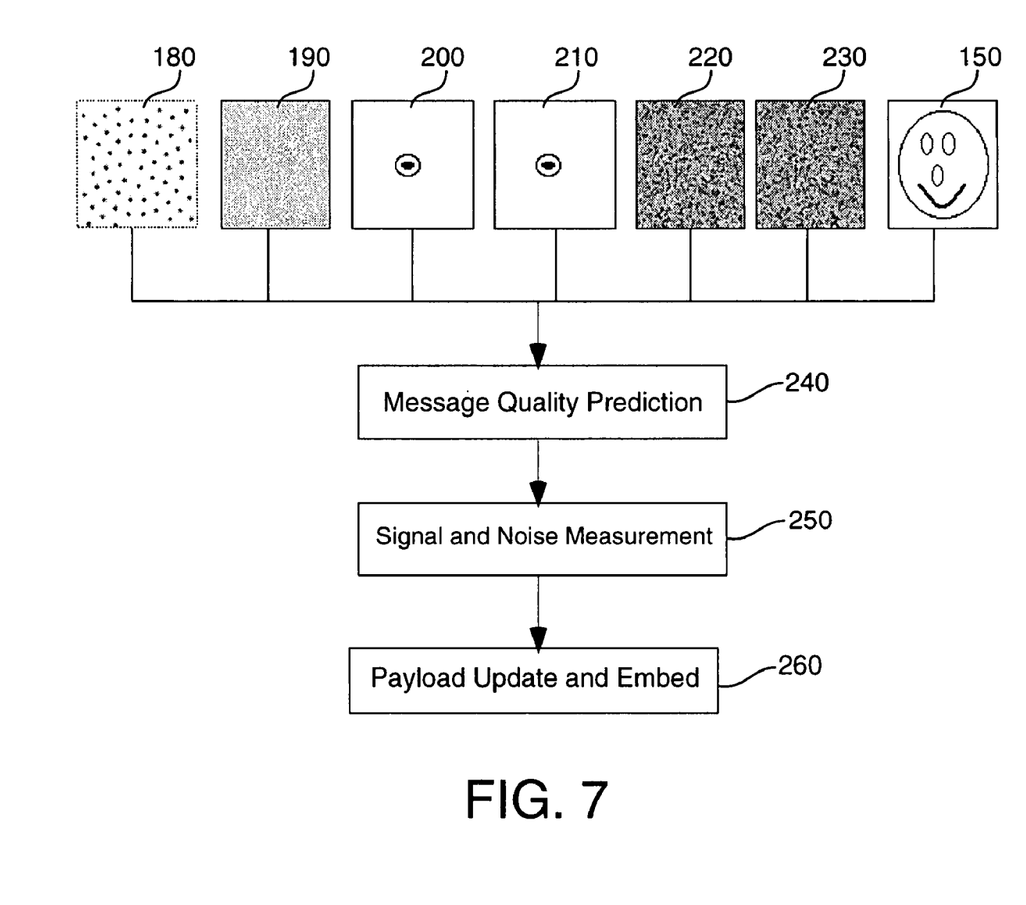
FIG. 7 is an embedding process for authentication.

FIG. 6 shows an image 140 broken into sub-blocks of width 128 pixels×128 lines. An image block n 150 is chosen as the first image block to be embedded with an image ID and authenticity information. The method for embedding authenticity information into this block will now be described. Referring to FIG. 7, a message image 180 is provided and at this point we shall assume that the message image contains only the image ID. The part of the message payload reserved for the authenticity information can contain any data, that is, the content of the authenticity data is not important at this point. The carrier image 190 is also required, along with the printer MTF image 200, the scanner MTF image 210 and the printer noise image 220 and the scanner noise image 230. The image block n, 150 is also required and all of these images are provided as input to the message quality prediction step 240. The message quality prediction step 240 applies Equation 12. The result of the message quality prediction step 240 is a predicted message image which is an image with the characteristics expected of an extracted signal that has undergone a print and scan of the modeled printer and scanner. Therefore, the signal and the noise of the resultant extracted message can be calculated. This signal and noise measurement is step 250 and will be specified in greater detail.

Figure 8:
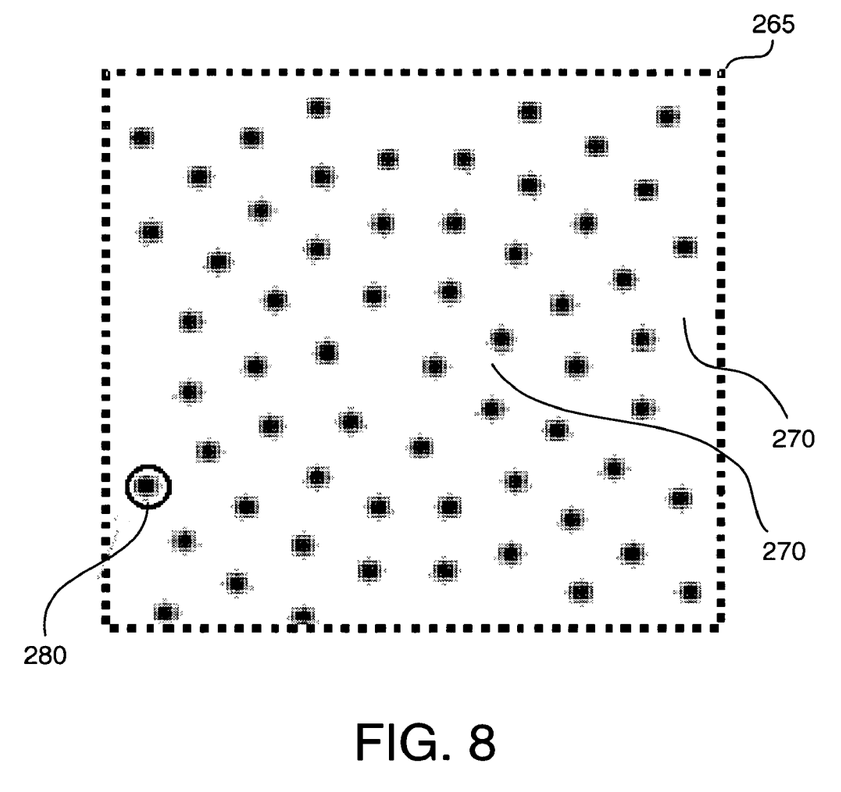
FIG. 8 is a diagram of a signal and noise measurement step.

This signal and noise measurement in step 250 of FIG. 7 will now be specified in greater detail. Referring to FIG. 8, there is shown a predicted message image 265. As mentioned earlier, the input message 180 contains, in the preferred embodiment, the image ID. The part of the payload reserved for authenticity information may contain random bits. At each dark dot in FIG. 8 is a bit value, which for reasons discussed earlier, are either zero's or one's. Since all data on the right hand side of Equation 12 has been correlated with the zero mean carrier $C(x,y)$, the result of Equation 12 is itself zero mean. This implies that the absolute value of the resultant image from step 240 (Equation 12) can be applied and no change should be encountered to calculating the average signal strength or noise variance. So the first part of step 250 is to take the absolute value of the predicted message. Next, the signal centers are averaged to produce an average signal. (An example signal center is the value of the center of the circle 280.) This average signal is the predicted signal. Next, the noise is estimated. The MTF of the printer and the scanner will have blurred the input bits, so when estimating the noise it is important to make sure that areas outside the signal region 280 are only considered. Examples of noise regions are shown as arrows see 270. Normally, regions that are 3 to 4 pixels away from any signal centers are sufficient. Simply take the standard deviation of these values is sufficient to estimate the noise in this process. Therefore predicted noise value is the standard deviation of the pixels outside (a 3 to 4 pixel radius) of the signal centers. The variation or standard deviation of the individual signal centers can be used also for further authentication (a third value) information.

Once the signal and the noise have been measured, they may be placed back into the message payload for embedding. This process is step 260. Recall that in the preferred embodiment, 64 bits are reserved for authenticity information. In the simplest case, step 260 embeds a 32 bit floating point representation of the measured signal and a 32 bit floating point representation of the measured standard deviation of the noise. A more compression technique can be used to conserve bits. For example, the variation of the signal and noise estimates for a wide variation of images does not require 32 bits per estimate; the practical range is only about 6 bits per estimate. Using compression leaves room for more authenticity data. An example of providing additional authenticity data is to store the variance or standard deviation about the mean signal. Storing the variance or standard deviation about the mean signal allows the predicted and the extracted data to be compared on the basis of the character of the statistical distributions. Comparison of the statistical distribution allows more of the laws of probability and statistics to be used in the system. For example, if the standard deviation about the mean signal is somewhat different between the predicted and the extracted message, the laws of probability and statistics can be applied to find out the actual probability (confidence level) that the image is authentic. This can provide for a more scientifically accurate validation system. Another benefit is that threshold confidence levels could be selected at a software console depending on the application. Therefore, a prize of a Hot Dog may have lower required confidence level than a one million-dollar lottery ticket. One would not have to change the underlying software for either application, only the desired confidence level.

Figure 9:
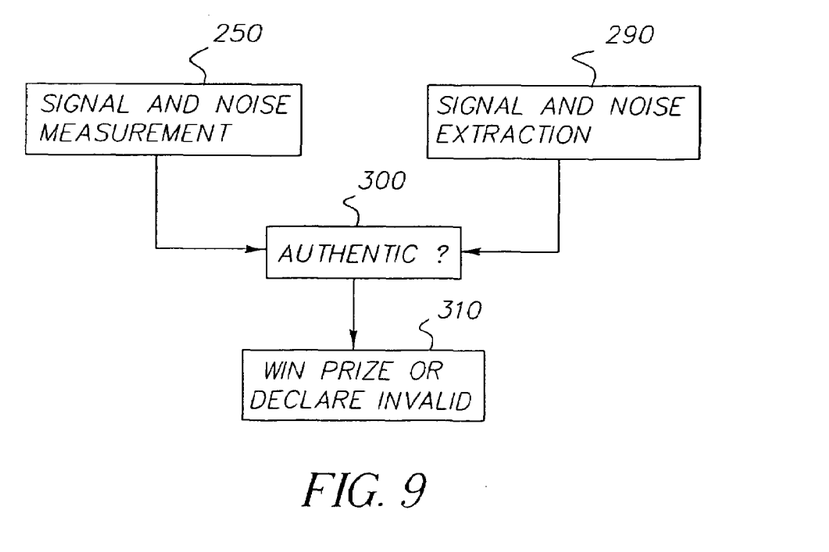
FIG. 9 is a diagram of an authentication decision step.

FIG. 9 represents the decision process used to authenticate a ticket. The image that is to be authenticated is scanned and an image region is extracted. The payload is extracted 290. Next, using the extracted message step 250 of FIG. 7 is used to measure the signal and the noise. If the signal and the noise measurements are within 10% of the extracted values, the ticket is declared authentic 300, otherwise it is considered counterfeit or suspicious 310.

The invention has been described in detail with particular reference to certain preferred embodiments thereof, but it will be understood that variations and modifications can be effected within the spirit and scope of the invention.

PARTS LIST 10 consumer
20 photofinisher or printer
30 pictures
40 print/embed
50 drug store
60 kiosk
70 embedded signal
80 winner
90 authentication
100 payload
110 image ID
120 authenticity data
140 image broken into sub-blocks
150 image block n
180 message image
190 carrier image
200 printer MTF image
210 scanner MTF image
220 printer noise image
230 scanner noise image
240 message quality prediction step
250 signal and noise measurement step
260 payload update and embedding step
265 predicted message image
270 noise region
280 signal region
290 signal and noise extraction step
300 authentication step
310 counterfeit or suspicious declaration step

What is claimed is:

1. A method for authenticating an image with an embedded signal, where the embedded signal includes a message image, the method comprising the steps of:
   (a) generating a predicted message image having degradations expected of an image that has undergone a print or scan process influenced by predetermined MTF Modulator Transfer Function or noise characteristics of a printer or scanner;
   (b) determining a prediction value based on the MTF or noise characteristics imparted by the print or scan process to the predicted message image;
   (c) including the prediction value with the embedded signal;
   (d) measuring MTF or noise characteristics of a message image in a suspect embedded signal after printing or scanning wherein measuring MTF of noise characteristic is done by determining the number of exact blurred input bits outside the area of predicted value; and
   (e) comparing the prediction value with the measured MTF or noise characteristics for authenticating the suspect signal.

2. The method as in claim 1 further comprising the step of controlling a machine as a result of the comparison.

3. The method as in claim 1, wherein step (b) includes determining the prediction value based on both the MTF and noise characteristics.

* * * * *